(12) United States Patent
Nakamura et al.

(10) Patent No.: US 6,614,623 B2
(45) Date of Patent: Sep. 2, 2003

(54) DISC DRIVE HEAD SUPPORTING MECHANISM HAVING POWER SUPPLY PADS FOR AN INTEGRATED CIRCUIT WHICH ARE OF A GREATER AREA THAN SIGNAL/CONTROL JUNCTION PADS

(75) Inventors: Shigeo Nakamura, Odawara (JP); Kousaku Wakatsuki, Odawara (JP); Haruhide Takahashi, Odawara (JP); Hitoshi Shindo, Odawara (JP); Hiromitsu Masuda, Odawara (JP); Mikio Tokuyama, Tsukuba (JP); Toshihiko Shimizu, Yasato (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 09/917,706

(22) Filed: Jul. 31, 2001

(65) Prior Publication Data

US 2002/0024767 A1 Feb. 28, 2002

(30) Foreign Application Priority Data

Aug. 10, 2000 (JP) .......................... 2000-247939

(51) Int. Cl.⁷ .................................................. G11B 5/48
(52) U.S. Cl. ..................................................... 360/244.1
(58) Field of Search ...................................... 360/244.1

(56) References Cited

U.S. PATENT DOCUMENTS 5,859,746 A * 1/1999 Ishida ..................... 360/244.1
6,483,669 B1 * 11/2002 Krinke ..................... 360/244.1

* cited by examiner

*Primary Examiner*—A. J. Heinz
(74) *Attorney, Agent, or Firm*—Antonelli, Terry, Stout & Kraus, LLP

(57) ABSTRACT

To restrain temperature rise by controlling heat radiation from an IC. More specifically, an area of junctioning pads which are in contact with an IC is enlarged to substantially overlap the whole or at least half or more of the area of the IC. Further, the IC is covered with an overcoat which protrudes to other parts of a head supporting mechanism.

12 Claims, 6 Drawing Sheets

DISC DRIVE HEAD SUPPORTING MECHANISM HAVING POWER SUPPLY PADS FOR AN INTEGRATED CIRCUIT WHICH ARE OF A GREATER AREA THAN SIGNAL/CONTROL JUNCTION PADS

BACKGROUND OF THE INVENTION

The present invention relates to a disk drive, such as a magnetic disk drive used in external recording devices for computers and electrical household appliances, an information recording device using the disk drives, and a head supporting mechanism for use therein, and a head assembly and a magnetic disk drive using this head supporting mechanism.

In a head supporting mechanism in which an IC is mounted on a flexure according to the prior art, the flexure has IC junction pads only in the parts which meet junction pads on the IC side.

A conventional IC-mounting head supporting mechanism, in which a temperature of the IC rises significantly, involves the problems of deterioration of accuracy of head positioning and poor reliability of the IC and the head supporting mechanism due to the uneven temperature of the head supporting mechanism ensuing from the heating of the IC.

However, if the supporting mechanism is so structured as to let the heat be discharged elsewhere than the terminals of the IC, the heat generated in the IC will accumulate in the insulating layer between it and the flexure, and the external discharge of heat will be made difficult.

SUMMARY OF THE INVENTION

In view of these problems, according to the present invention, a head supporting mechanism is provided with a flexure for holding a head slider which records and/or reproduces data into or out of a data recording device; a load beam for holding this flexure and applying a load onto the head slider; and an IC for strengthening the recording and/or reproduction by the head slider mounted on the flexure, and external discharging of heat from the IC is facilitated by enlarging the square measure of a pad for supplying the IC with driving electricity, out of junction pads of the flexure for electrically junctioning this IC and the flexure, than any other pad.

Furthermore, the IC is overcoated for heat transfer to the head supporting mechanism.

DESCRIPTION OF THE PREFERRED EMBODIMENTS

An embodiment of carrying out the present invention will be described below by taking a magnetic disk drive as an example.

Figure 1:
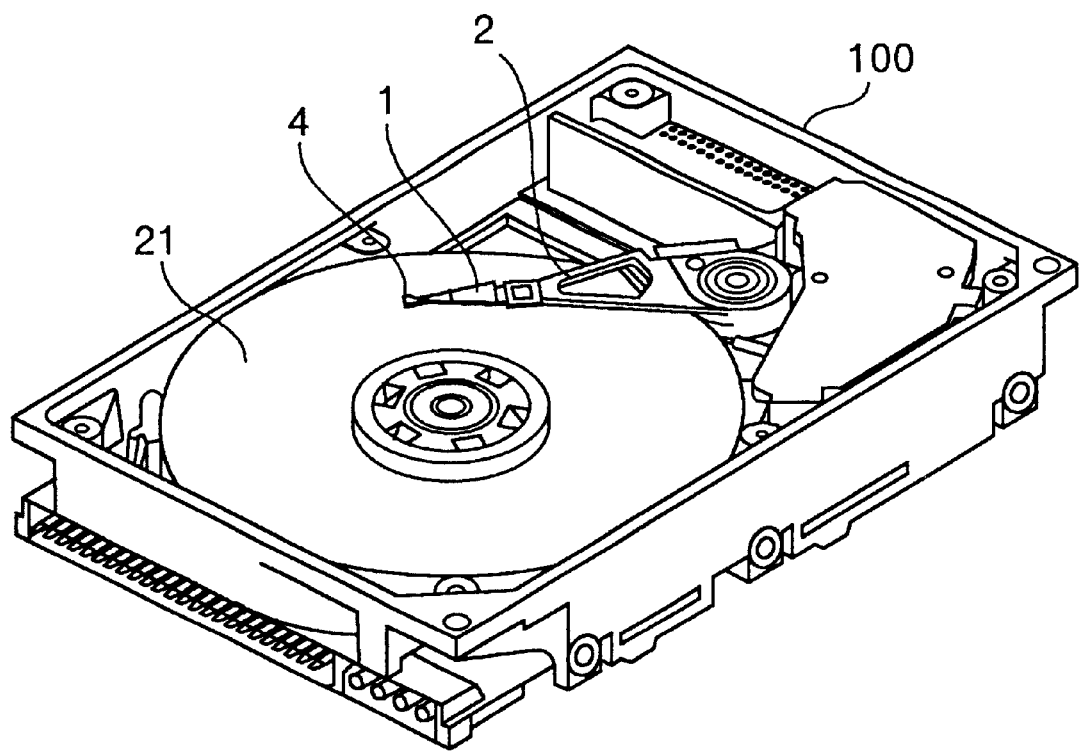
FIG. 1 shows a perspective view of a magnetic disk drive.

FIG. 1 shows the magnetic disk drive embodying the present invention. In a magnetic disk drive 100, a head supporting mechanism 1, whose details will be illustrated in FIG. 2, is configured as a head assembly provided on one side with a head slider 4 and on the other side with a mount 3, which is fixed to a carriage arm 2, and moves over a recording medium 21 to read or write data out of or onto the recording medium 21.

Figure 2:
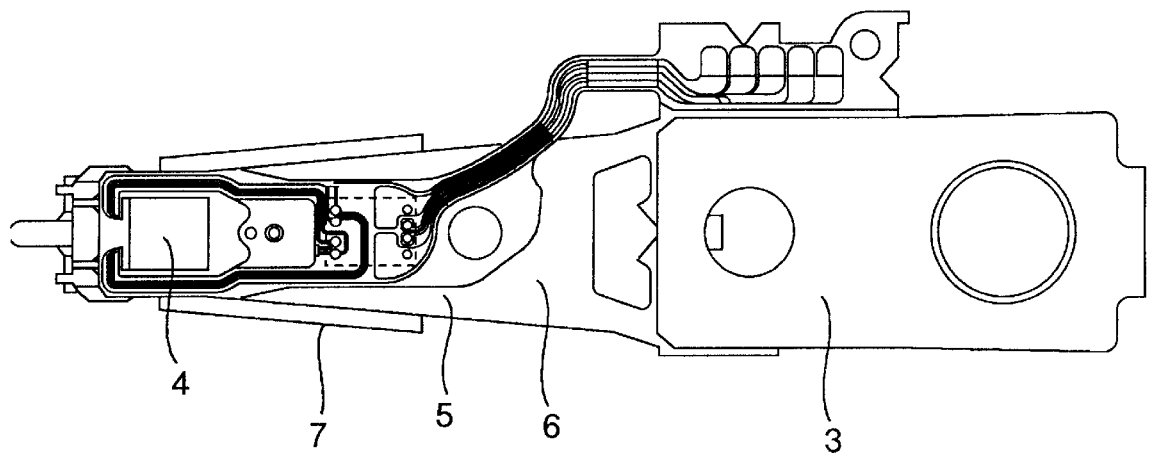
FIG. 2 shows a plan view of a head assembly.

FIG. 2 shows a plan view of the head assembly used in the magnetic disk drive of FIG. 1. The head assembly is configured by a mount 3 junctioned to the carriage arm 2 of the magnetic disk drive, a flexure 5 for holding a head slider 4 for mounting a recording/reproducing head and integrated with a signal line, a load beam 6 for junctioning the mount 3 and the flexure 5 and applying a load onto the head slider 4, and a damper which is not shown for attenuating the vibration of the load beam 6. An IC 7 for reinforcing the data recording and/or reproduction performances onto or out of the recording medium is mounted on the flexure 5.

Figure 3:
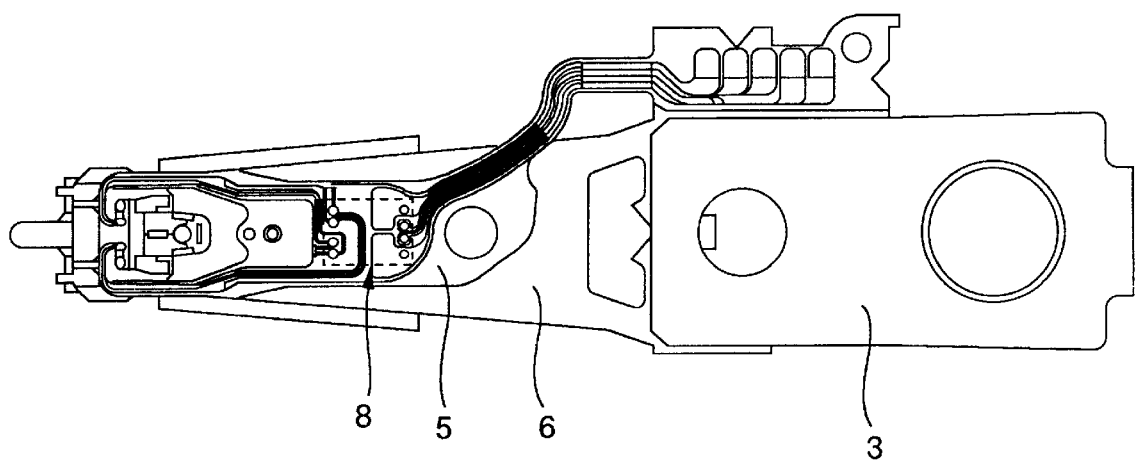
FIG. 3 shows a plan view of a head supporting mechanism, which corresponds to the head assembly shown in FIG. 2 deprived of an IC and a head.
Figure 4:
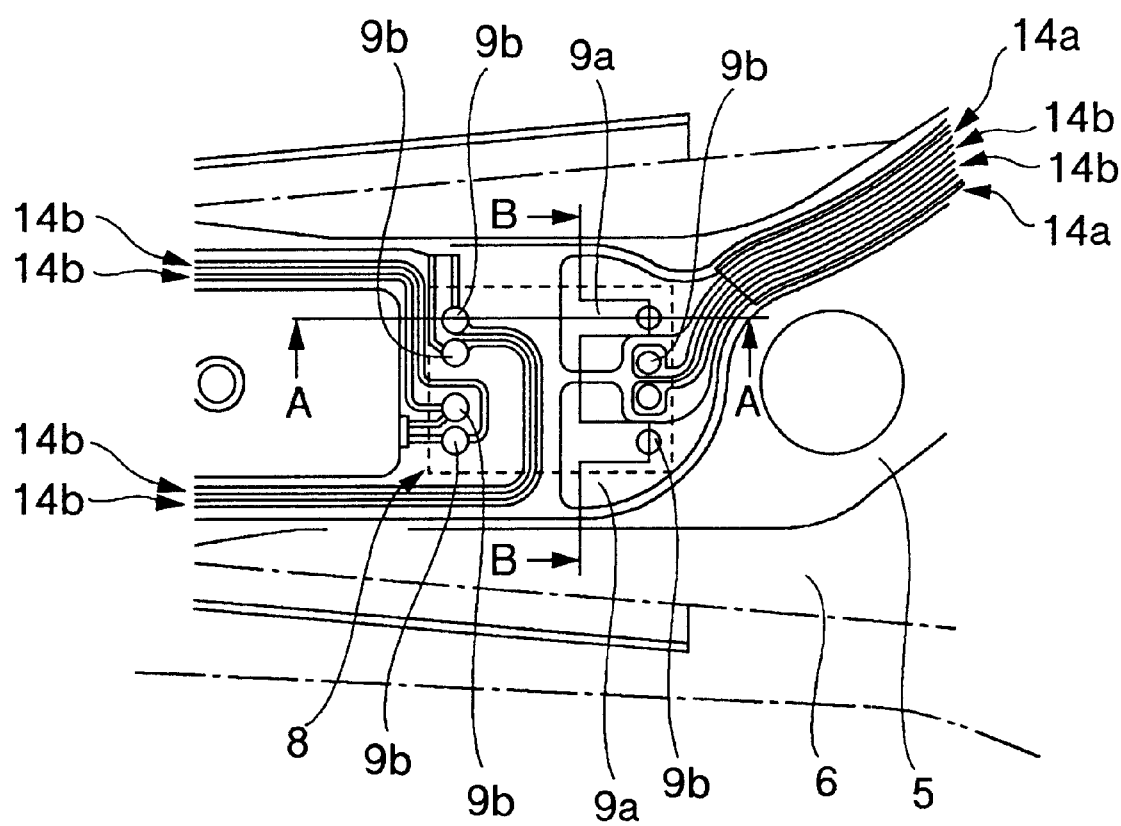
FIG. 4 shows an expanded view in the vicinity of an IC-fitted section of the head supporting mechanism.
Figure 5:
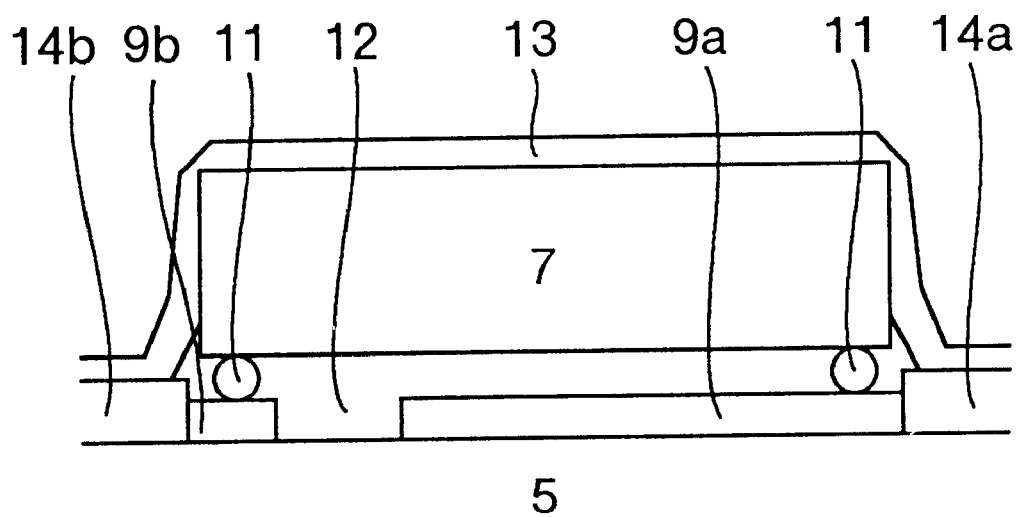
FIG. 5 shows an A—A sectional view in the vicinity of the IC illustrated in FIG. 4.
Figure 6:
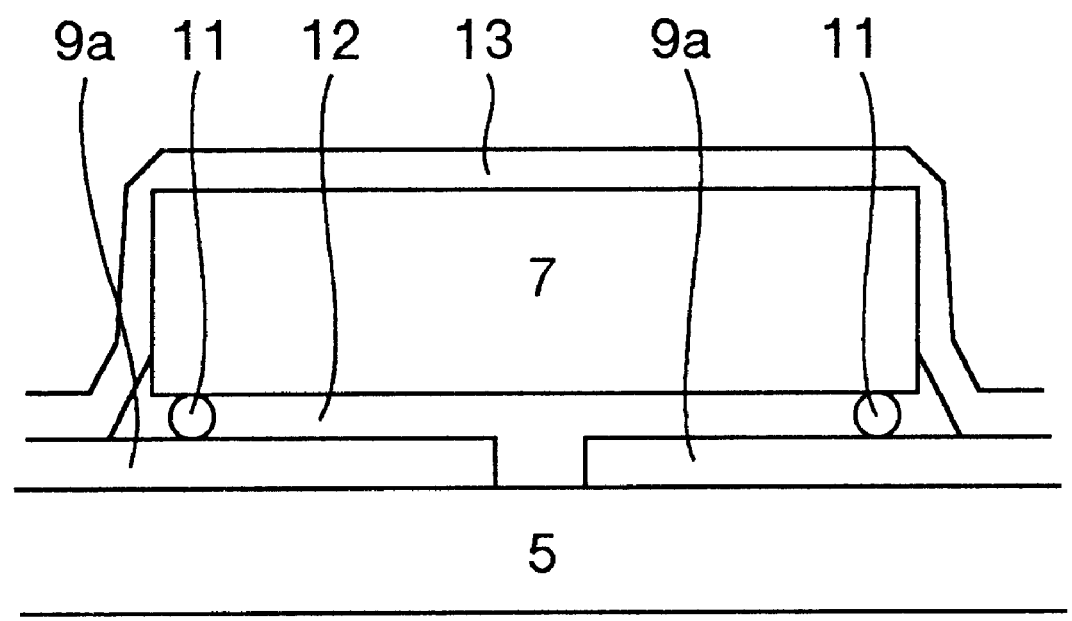
FIG. 6 shows a B—B sectional view in the vicinity of the IC illustrated in FIG. 4.

FIG. 3 shows a plan view of the supporting mechanism used for the head assembly of FIG. 2, and FIG. 4, an expanded view in the vicinity of the IC connecting part shown in FIG. 3. FIG. 5 shows an A—A sectional view in the vicinity of the IC 7 illustrated in FIG. 4, and FIG. 6, a B—B sectional view of the same. The head assembly here means an assembly combining the head supporting mechanism 1 and the slider 4.

Within an IC 7-fitted section 8 (within a broken line) of the flexure 5, there are provided a power supply pad 9a for junctioning the IC 7 and a power supply line 14a and a signal/control pad 9b for junctioning the IC 7 and a signal/control line 14b. In the supporting mechanism according to the present invention, out of these junctioning pads 9, the power supply pad 9a through which an electric current flows, the flow being the main cause of the heating of the IC 7, is larger than the signal/control pad 9b (see FIGS. 4 and 5). The junctioning pads 9 is so shaped as to cover substantially all of the IC 7 (see FIGS. 4 and 6). By expanding the area of the power supply pad 9a, the heat generated in the IC 7 is enabled to escape outside through a bump 11 and the power supply pad 9a.

The size of the power (driving electricity) supply pad 9a is expanded but that of the signal/control pad 9b is not because the increase in electrostatic capacitance of the junction can thereby be prevented from deteriorating the transmission performance. The power supply line 14a is made as thick as practicable both to improve its thermal conductivity and to reduce the heat emission by the power supply line 14a itself, and the width, rather than the transmission performance, of the signal/control line 14b is optimized, resulting in the greater thickness of the power supply line 14a than that of the signal/control line 14b.

The IC 7 and the junctioning pads 9 are junctioned with the bump 11 made of either gold or solder, and the gap between the IC 7 and the flexure 5 (including the junctioning pads 9) is filled with an under-fill 12 elsewhere than the bump 11.

In the flexure 5, the junctioning pads 9 and the power supply/signal/control lines 14 connected thereto are formed of copper or gold, and other parts of the flexure are formed of polyimide or stainless steel, with the result that stacking the junctioning pads 9 and the IC 7 facilitates heat radiation from the IC 7. The greater their overlapping area the more favorable, but considering the possible problems of impediment to insulation between the junctioning pads 9, their surface leaks and manufacturing difficulty, a rule-of-thumb measure may be to overlap half the area or more of the IC 7.

Further, the IC 7 is covered with an overcoat 13 for assisting in heat conduction, and the overcoat 13 also covers part of the flexure 5 and the load beam 6. During its operation, the IC 7 emits heat mainly via the routes of:

(1) IC 7→bump 11→junctioning pads 9→flexure 5
(2) IC 7→under-fill 12→flexure 5
(3) IC 7→the overcoat 13→flexure 5/load beam 6

Particularly, the smaller size of the under-fill 12 part has resulted in reduced heat conduction on route (2) and an increased proportion of (1) compared with the prior art, with the consequence of less accumulation of heat between the IC 7 and the flexure 5.

In the absence of the overcoat 13, the routes are:
(1) IC 7→bump 11→junctioning pads 9→flexure 5
(2) IC 7→under-fill 12→flexure 5
(4) IC 7→air Where the overcoat 13 is made of an overcoating material for electronic components, thermal resistance is greater on (4) than on (3), resulting in improved heat radiation performance of the IC 7. Whether to use an overcoat 13 or not can be determined according to the quantity of heat emitted by the IC and the conditions of drive use.

The greater lateral size of the power supply pad 9a than that of the IC 7 has made it also possible to directly discharge heat instead of letting it out via the flexure 5.

On route (2), the thinner the under-fill 12, the more difficult for heat to accumulate, resulting in improved heat radiation performance of the IC 7.

As described above, by improving the heat radiation performance of the IC 7 and restraining the temperature rise of the IC 7, the accuracy of head positioning can be prevented from being adversely affected by the uneven temperature of the head supporting mechanism 1 due to heat emission from the IC 7 and so can be the reliability of the IC 7 and the head supporting mechanism 1 from deterioration. Therefore, a magnetic disk drive whose head supporting mechanism 1 is mounted with an IC 7 which strengthens recording and/or reproduction performances are can be realized, the magnetic disk drive being also increased in recording density and capacity.

Although the IC 7 is junctioned to the flexure 3 in this embodiment, junctioning the IC 7 to an FPC and sticking them to the load beam 6 would provide a similar effect.

This effect can be achieved not only for magnetic disk drives but also for optical disk drives whose head supporting mechanism is mounted with an IC and other disk drives including optical magnetic disk drives and probe memories. The use of such large-capacity disk drives would provide a further effect of making it possible to realize disk array systems including large-capacity RAID systems and recording devices for cybernetically oriented electrical household appliances, such as a set top box or the like.

Although the foregoing embodiment uses a magnetic disk as an example of disk-shaped recording medium, it goes without saying that any other recording medium can be used where the data recording drive requires a similar head supporting mechanism.

By using a head assembly with an IC of which the temperature rise is restrained and the recording and/or reproduction performances are strengthened, a large-capacity disk drive can be realized. Furthermore, by using such a disk drive, a large-capacity information recording drive can be realized.

What is claimed is:

1. A head supporting mechanism, comprising:
    a flexure for holding a head slider for recording and/or reproducing information onto or out of a medium;
    a load beam for holding this flexure and applying a load onto said head slider;
    an IC for strengthening recording and/or reproduction by said head slider;
    signal/control junctioning pads for connecting this IC and signal/control lines; and
    a power supply pad for connecting said IC having a greater area than these signal/control junctioning pads to a power supply line.

2. The head supporting mechanism as set forth in claim 1, wherein the area of said power supply pad overlaps half or more of that of said IC.

3. The head supporting mechanism as set forth in claim 1, wherein said power supply pad protrudes beyond said IC in the widthwise direction of the supporting mechanism.

4. The head supporting mechanism as set forth in claim 1, wherein said IC is overcoated.

5. A head assembly, comprising:
    a head slider for recording and/or reproducing information onto or out of a medium;
    a flexure for holding this head slider;
    a load beam for holding this flexure and applying a load onto said head slider;
    an IC for strengthening recording and/or reproduction by said head slider;
    signal/control junctioning pads for connecting this IC and signal/control lines; and
    a power supply pad for connecting said IC having a greater area than these signal/control junctioning pads to a power supply line.

6. The head assembly as set forth in claim 5, wherein the area of said power supply pad overlaps half or more of that of said IC.

7. The head assembly as set forth in claim 5, wherein said power supply pad protrudes beyond said IC in the widthwise direction of the supporting mechanism.

8. The head assembly as set forth in claim 5, wherein said IC is overcoated.

9. A magnetic disk drive, comprising:
    a medium for recording information thereon;
    a head slider for recording information onto or reproducing recorded information out of this medium;
    a flexure for holding this head slider;
    a load beam for holding this flexure and applying a load onto said head slider;
    a mount for holding this load beam;
    a carriage arm for holding this mount and positioning said head slider over said medium;
    an IC for strengthening recording and/or reproduction by said head slider;
    signal/control junctioning pads for connecting this IC and signal/control lines; and
    a power supply pad for connecting said IC having a greater area than these signal/control junctioning pads to a power supply line.

10. The head magnetic disk drive as set forth in claim 9, wherein the area of said power supply pad overlaps half or more of that of said IC.

11. The head magnetic disk drive as set forth in claim 9, wherein said power supply pad protrudes beyond said IC in the widthwise direction of the supporting mechanism.

12. The magnetic disk drive as set forth in claim 9, wherein said IC is overcoated.

* * * * *